US006424337B1

(12) United States Patent
Eriksson et al.

(10) Patent No.: US 6,424,337 B1
(45) Date of Patent: Jul. 23, 2002

(54) MULTI-FUNCTION CONTROL DEVICE FOR VEHICLE

(75) Inventors: Harry S. Eriksson, Trollhattan; Jim Ankersson, Fagersanna, both of (SE)

(73) Assignee: Lear Corporation, Southfield, MI (US)

(*) Notice: Subject to any disclaimer, the term of this patent is extended or adjusted under 35 U.S.C. 154(b) by 0 days.

(21) Appl. No.: 09/512,180

(22) Filed: Feb. 24, 2000

Related U.S. Application Data

(60) Provisional application No. 60/121,563, filed on Feb. 25, 1999.

(51) Int. Cl.[7] .................................................. G09G 5/08
(52) U.S. Cl. ..................................... 345/163; 345/156
(58) Field of Search ................................ 345/156, 157, 345/163, 167, 168, 169, 158; 701/23, 24, 25, 26

(56) References Cited

U.S. PATENT DOCUMENTS

| 5,086,510 A | | 2/1992 | Guenther et al. | |
|---|---|---|---|---|
| 5,453,929 A | | 9/1995 | Stove | |
| 5,555,502 A | | 9/1996 | Opel | |
| 5,806,664 A | | 9/1998 | Hartman et al. | |
| 5,848,364 A | * | 12/1998 | Ohashi | 701/26 |
| 6,104,969 A | * | 8/2000 | Beeks | 345/157 |
| 6,300,939 B1 | * | 10/2001 | Decker et al. | 345/157 |

FOREIGN PATENT DOCUMENTS

| DE | 33 46 370 A1 | 7/1985 |
|---|---|---|
| EP | 0 701 926 A2 | 3/1996 |
| EP | 0 816 155 A2 | 1/1998 |
| EP | 0 846 588 A2 | 6/1998 |
| WO | WO 97/13657 | 4/1997 |

OTHER PUBLICATIONS

Derwent Abstract Corresponding to EP 0 701 926 A2.
Derwent Abstract Corresponding to EP 0 816 155 A2.
Derwent Abstract Corresponding to DE 33 46 370 A1.

* cited by examiner

*Primary Examiner*—Xiao Wu
(74) *Attorney, Agent, or Firm*—Brooks & Kushman P.C.

(57) ABSTRACT

A multi-function control device for use with a motor vehicle includes a display unit adapted to be mounted to the vehicle. The display unit has a display screen for displaying information associated with a plurality of vehicle functions, and a plurality of keys corresponding to the plurality of vehicle functions. Each of the keys is operable to select a particular vehicle function so as to display information associated with the particular vehicle function on the display screen. The control device further includes a mouse adapted to be mounted to the vehicle proximate the display unit. The mouse has at least one mouse switch in communication with the display unit. Furthermore, the at least one mouse switch is operable to control the plurality of vehicle functions.

12 Claims, 4 Drawing Sheets

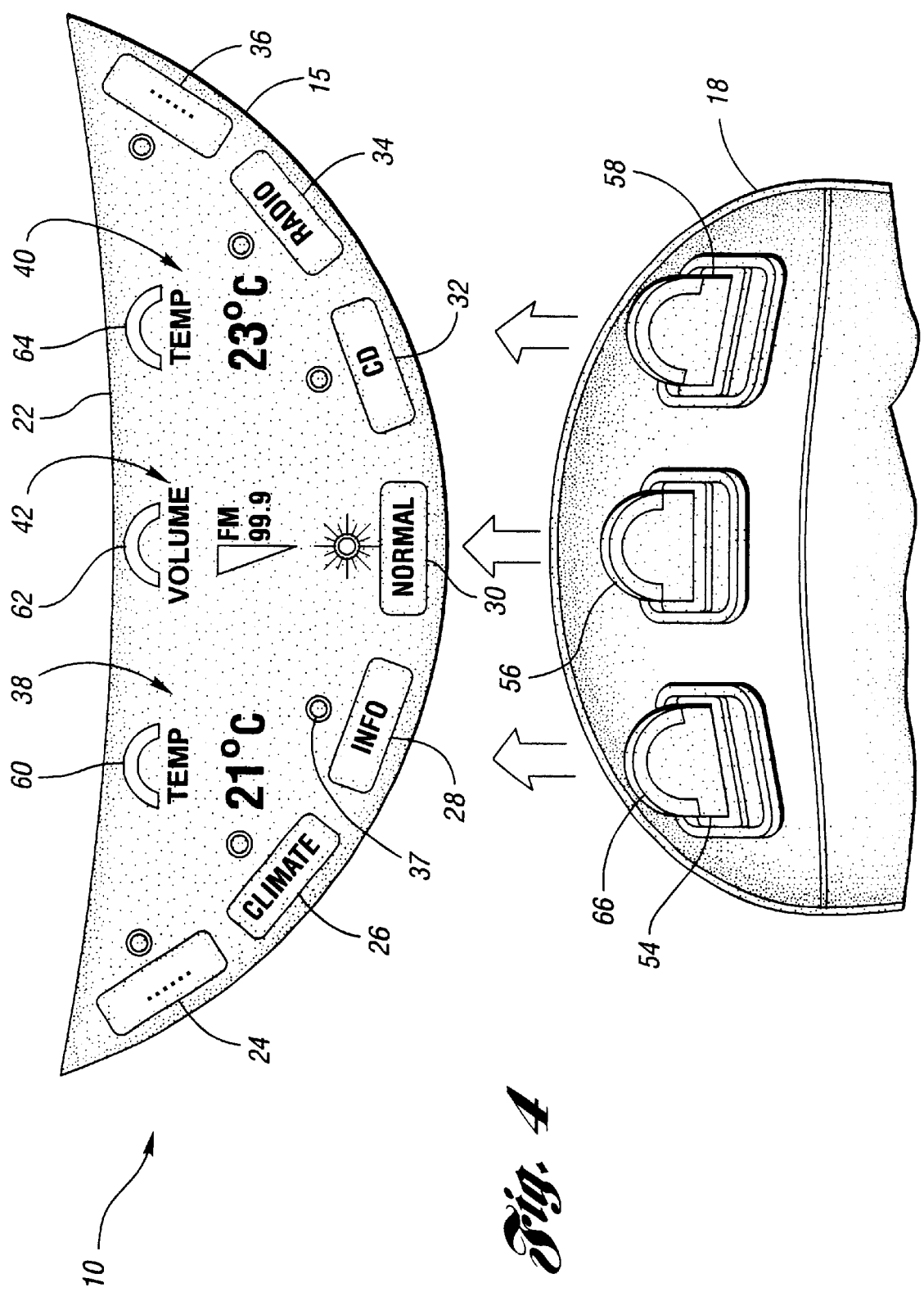

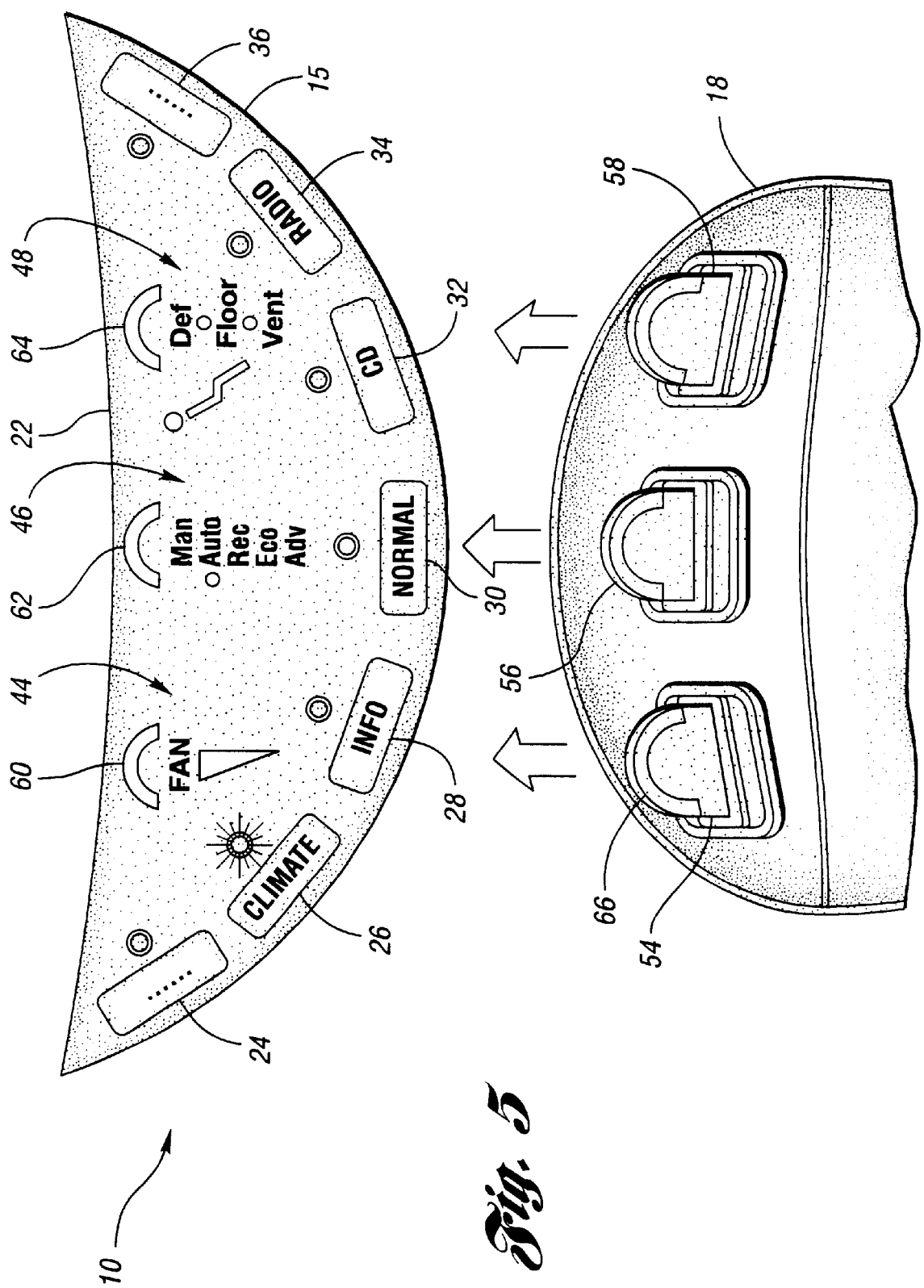

MULTI-FUNCTION CONTROL DEVICE FOR VEHICLE

CROSS-REFERENCE TO RELATED APPLICATIONS

This application claims the benefit of U.S. provisional application Ser. No. 60/121,563 filed Feb. 25, 1999.

TECHNICAL FIELD

The present invention relates to a multi-function control device for controlling various vehicle functions of a motor vehicle.

BACKGROUND ART

Typically, vehicle components such as a climate control system, radio, compact disk player, and vehicle information displays are controlled independently by separate control devices mounted on an instrument panel and/or console. This requires a significant amount of packaging space in the instrument panel and/or console, and involves multiple components requiring significant engineering, manufacturing and assembly costs. Additionally, control keys of the various control devices are generally spaced across the instrument panel and/or console so that the driver must sometimes search for multiple control keys in order to control the various vehicle components.

DISCLOSURE OF INVENTION

The present invention overcomes the shortcomings of the prior art by providing an ergonomic control device that can control multiple vehicle components or systems, which may be referred to as vehicle functions. The control device is easier to use than prior independent control devices, and enables engineering, manufacturing and assembly costs to be significantly reduced.

Under the invention, a multi-function control device for use with a motor vehicle includes a display unit adapted to be mounted to the vehicle. The display unit has a display screen for displaying information associated with a plurality of vehicle functions, and a plurality of keys corresponding to the plurality of vehicle functions. Each of the keys is operable to select a particular vehicle function so as to display information associated with the particular vehicle function on the display screen. The control device further includes a mouse adapted to be mounted to the vehicle proximate the display unit. The mouse has at least one mouse switch in communication with the display unit. Furthermore, the at least one mouse switch is operable to control the plurality of vehicle functions.

Preferably, the display unit has at least seven keys and the mouse has at least three mouse switches. Alternatively, the display unit may have any suitable number of keys, and the mouse may have any suitable number of mouse switches.

The display screen may provide a normal display for displaying information associated with at least one of the plurality of vehicle functions, an active display for each vehicle function for displaying at least one feature of each vehicle function, and an advanced display for each vehicle function for displaying another feature of each vehicle function. As a result, a relatively large number of features may be displayed for each vehicle function.

Preferably, the mouse is adapted to be moveably mounted to the vehicle. With such a configuration, the mouse may be moved between a plurality of use positions to accommodate a variety of different users.

Further under the invention, a multi-function control device for use with a motor vehicle includes a display unit adapted to be mounted to the vehicle. The display unit has a display screen for displaying features associated with a plurality of vehicle systems, and a plurality of keys corresponding to the plurality of vehicle systems. Each of the keys is operable to select a particular vehicle function so as to display at least one feature associated with the particular vehicle systemon on the display screen. The control device further includes a mouse adapted to be mounted to the vehicle proximate the display unit. The mouse has a plurality of mouse switches in communication with the display unit, and the mouse switches are operable to control the plurality of vehicle systems.

These and other objects, features and advantages of the invention are readily apparent from the following detailed description of the best modes for carrying out the invention when taken in conjunction with the accompanying drawings.

BRIEF DESCRIPTION OF DRAWINGS

FIG. 4 is a schematic illustration of the control device illustrating a normal use display in accordance with the present invention;

FIG. 5 is a schematic illustration of the control device illustrating an active use display in accordance with the present invention.

BEST MODES FOR CARRYING OUT THE INVENTION

Figure 1:
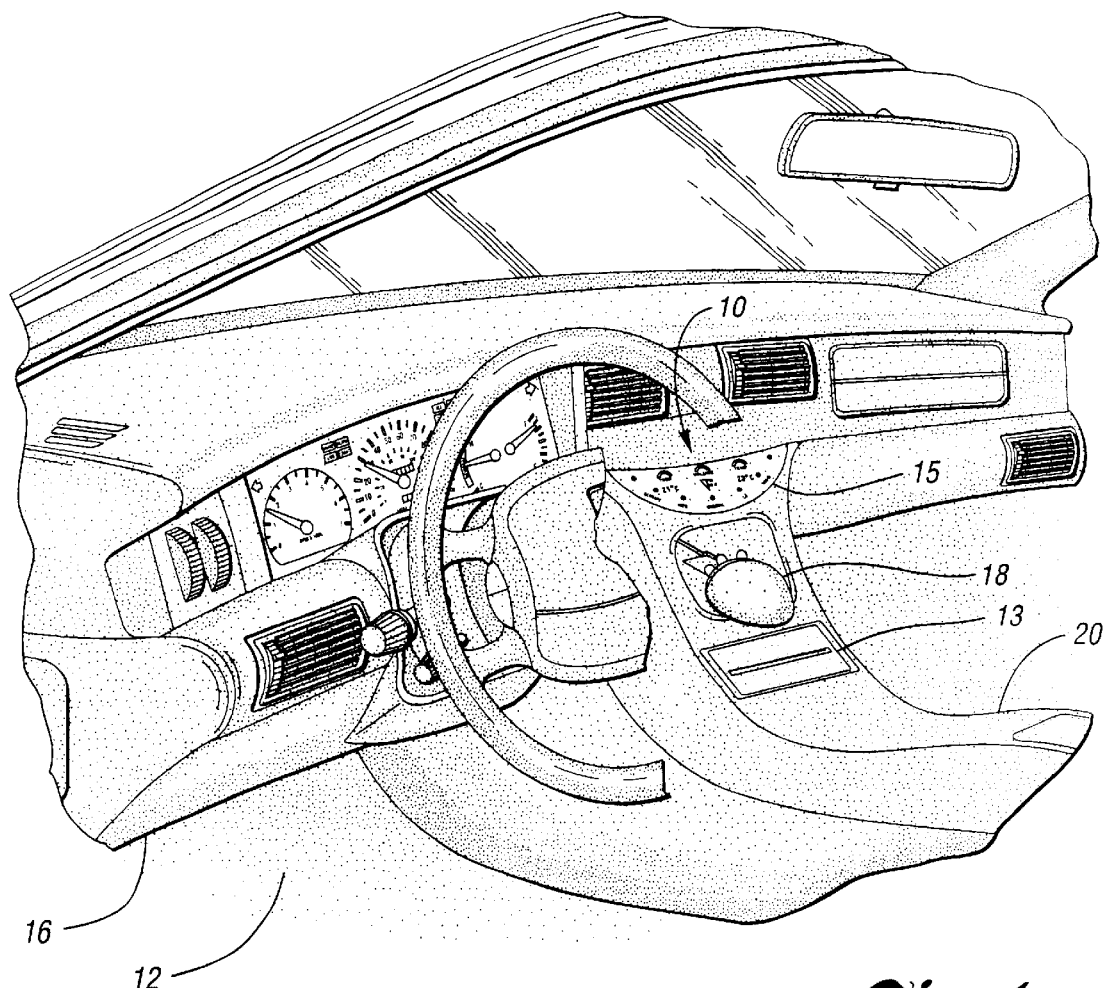
FIG. 1 is a perspective view of a vehicle instrument panel incorporating a multi-function control device in accordance with the present invention, wherein the control device includes a display unit in communication with a control mouse.
Figure 2:
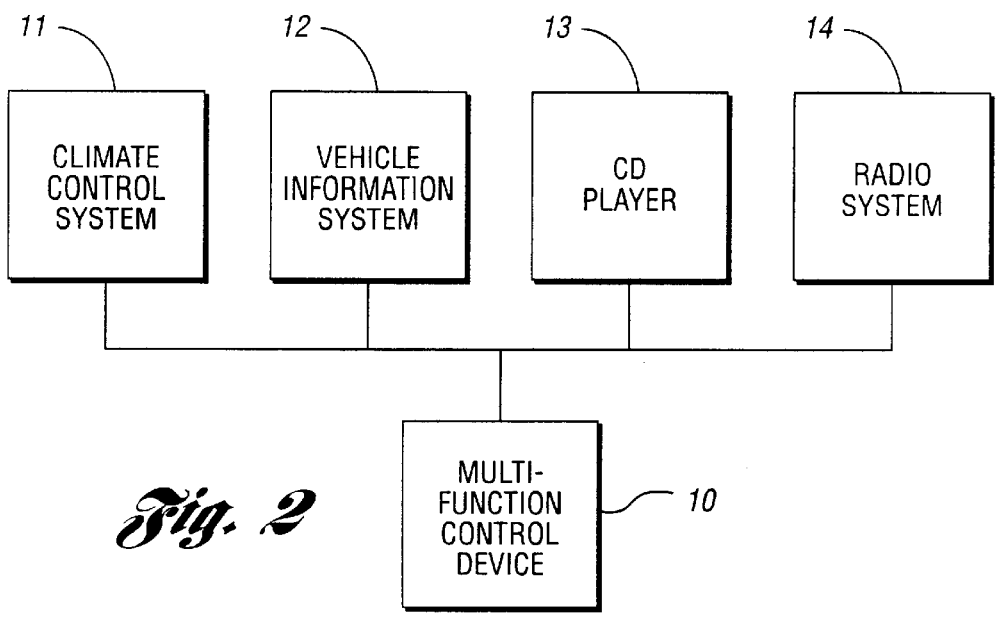
FIG. 2 is a schematic view of the control device in communication with a plurality of vehicle functions.

FIGS. 1 and 2 show a multi-function universal control device 10 according to the invention for use with a motor vehicle. The control device 10 is in electrical communication with a plurality of vehicle components or systems, such as a climate control system 11, a vehicle information system 12, a compact disk (CD) player 13, and a radio system 14. Such components or systems may be referred to as vehicle functions. The control device 10 is preferably configured to receive input from each of the vehicle functions, and to provide output to each of the vehicle functions so that the control device 10 may be used to control each of the vehicle functions as explained below in greater detail.

Figure 3:
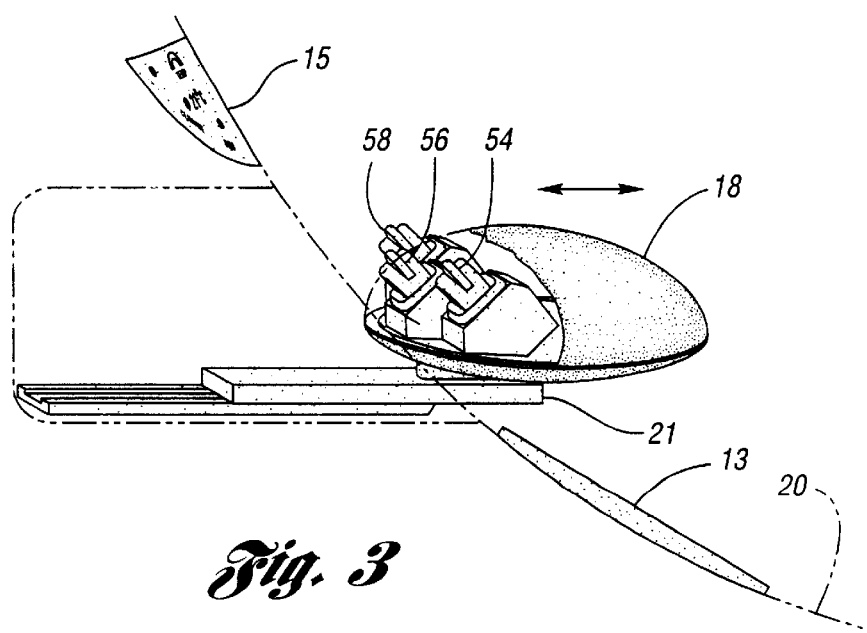
FIG. 3 is a perspective side view of the control device showing the control mouse in one of a plurality of use positions.

The control device 10 has a display unit 15 mount ed to a vehicle instrument panel 16, and a control mouse 18 that is preferably moveably mounted to an integral console 20 of the instrument panel 16. For example, as shown in FIG. 3, the control mouse 18 may be mounted on a sliding track system 21. Advantageously, with such a configuration, the control mouse 18 may be moved forwardly a nd rearwardly between a plurality of use positions so as to accommodate a variety of different users. Alternatively, the control device 10 may be mounted in any suitable location in the vehicle 12.

Figure 6:
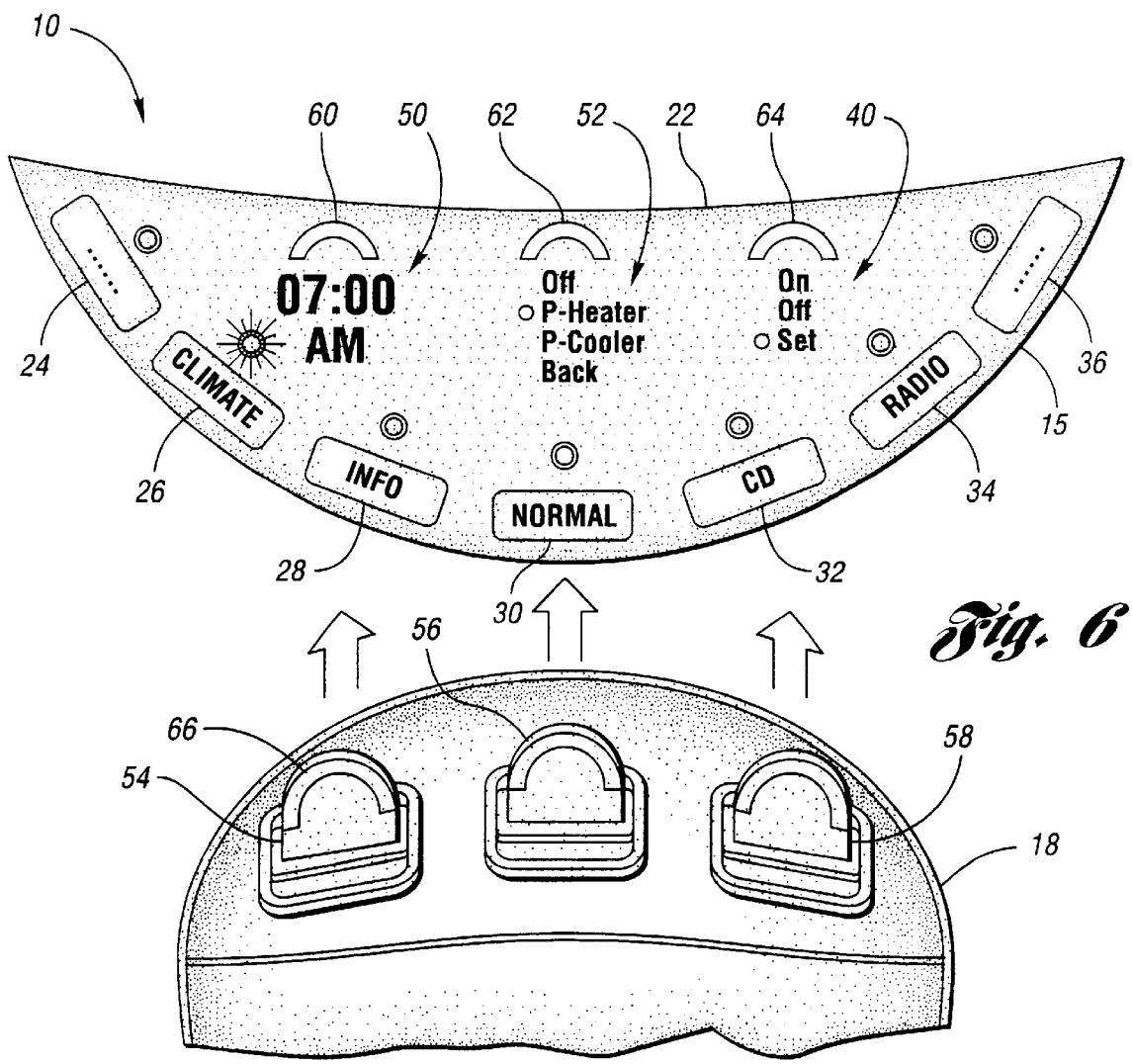
FIG. 6 is a schematic illustration of the control device illustrating an advanced use display.

Referring to FIGS. 4–6, the display unit 15 has a display screen 22 and a plurality of function buttons or keys, including function key 24, climate key 26, information or info key 28, normal key 30, CD key 32, radio key 34, and function key 36. Each of these function keys 24–36 may be used to select a particular vehicle function or functions so as to display information or features associated with the particular vehicle function or functions on the display screen 22. Furthermore, the display unit 15 has a plurality of lights 37, one light 37 for each function key 24–36, that illuminate when the corresponding function key 24–36 has been selected.

The display screen 22 may provide a normal use display for displaying features associated with at least one of the plurality of vehicle functions, an active use display for each vehicle function for displaying one or more other features associated with each vehicle function, and an advanced use display for each vehicle function for displaying yet one or more other features associated with each vehicle function. For example, normal key 30 may be pressed or otherwise actuated so as to display the normal use display on the display screen 22, as shown in FIG. 4. The normal use display may provide, for example, first and second or driver and passenger temperature controls 38 and 40, respectively, for the climate control system 11. The normal use display may also provide a volume control 42 for the radio system 14.

Referring to FIG. 5, the climate key 26 may be pressed or otherwise actuated so as to display the active use display for the climate control system 11. This active use display may include one or more features associated with the climate control system 11, such as fan speed 44, control options 46, and air distribution options 48. Referring to FIG. 6, the climate key 26 may be pressed or otherwise actuated a second time so as to display the advanced use display for the climate control system 11. This advanced use display may include one or more other features associated with the climate control system 11, such as a clock 50 and parking climate control options 52.

Referring to FIGS. 3 and 4, the control mouse 18 is in electrical communication with the display unit 15, and has first, second and third control keys or mouse switches 54, 56 and 58, respectively, that are operative to control vehicle functions displayed on the display screen 22. Preferably, each mouse switch 54, 56 and 58 is moveable in two directions so that each mouse switch 54, 56 and 58 can be used to efficiently modify or adjust a particular feature of a particular vehicle function, such as by increasing or decreasing magnitude of the particular feature, or so that each mouse switch 54, 56 and 58 can be used to scroll up or down a list of options associated with a particular feature. For example, each mouse switch 54, 56 and 58 may be configured to move upwardly and downwardly or forwardly and rearwardly. Furthermore, the first, second and third mouse switches 54, 56 and 58, respectively, preferably respectively correspond to first, second and third columns or portions on the display screen 22, which portions are identified by first, second and third arcuate lights 60, 62 and 64, respectivley. Each mouse switch 54, 56 and 58 also preferably has a light 66 so that the mouse switches 54, 56 and 58 can be easily located in low lighting conditions.

Still referring to FIG. 4, when the normal use display is shown on the display screen 22, the mouse switch 54 may be used to in crease or decrease the temperature setting of the driver temperature control 38, and the mouse switch 58 may be used to increase or decrease the temperature setting of the passenger temperature control 40. In addition, the mouse switch 56 may be used to adjust the volume control 42.

When the active use display for the climate control system 11 is being displayed on the display screen 22, as shown in FIG. 5, the mouse switch 54 may be used to adjust fan speed 44, and the mouse switch 58 may used to select a desired air distribution option, such as defrost mode, floor mode or vent mode, from the air distribution options 48. Furthermore, the mouse switch 56 may be used to select a desired control option, such as manual (Man), automatic (Auto), recirculation (Rec), or economy (Eco), from the control options 46. The mouse switch 56 may also be used to select the advanced use display, which is indicated as "Adv" under the control options 46. Alternatively, as mentioned above, if the active use display for the climate control system 41 is being displayed by the display screen 22, the climate key 26 may be pressed to obtain the advanced use display for the climate control system 11.

When the advanced use display for the climate control system 11 is being displayed on the display screen 22, as shown in FIG. 6, the mouse switches 54, 56 and 58 may be used to control the displayed features. For example, the mouse switch 56 may be used to activate a parking heater (P-Heater) or a parking air conditioner (P-cooler), which are identified under the parking climate control options 52. The mouse switch 56 may also be used to return to the active use display by selecting "Back" under the parking climate control parameters 52.

To return to the normal use display, the normal key 30 may be pressed at any time. Preferably, the control device 10 is configured to return to the normal use display after a predetermined amount of time has lapsed without any movement of the mouse switches 54, 56 and 58. Furthermore, the control device 10 is preferably configured to display the normal use display when the vehicle is first started.

The other function keys 24, 28, 32, 34 and 36 in conjunction with the mouse switches 54, 56 and 58 may be used in a similar manner to control other vehicle functions. For example, the radio key 34 may be pressed to display the active use display for the radio system 14 on the display screen 22. This display may include such parameters or features as am/fm selection control, station selection control and a volume control. Again, the mouse switches 54, 56 and 58 may be used to select or adjust these features. The advanced use display for the radio system 14 may include additional features such as balance, tone and fade.

As another example, the info key 28 may be pressed to display the active use display for the vehicle information system 12. This display may include such features as a trip-odometer, a gas gauge and fuel economy information. The advanced use display for the vehicle information system may include additional features such as an oil gauge and maintenance schedules.

It is to be understood that the configuration of the control device 10 described above is merely an example of one suitable configuration. The display unit 15 may be provided with any suitable number of function keys, and the mouse 18may be provided with any suitable number of control keys or mouse switches. Furthermore, the displays shown on the display screen 22 may have any suitable configuration and include any suitable information or features related to one or more vehicle functions.

Because the control device 10 can control operation of multiple vehicle functions, the number of independent control devices required on the instrument panel 16 may be significantly reduced compared with prior instrument panels. Thus, manufacturing and assembly costs can be significantly reduced compared with prior instrument panels.

Furthermore, because the control keys or mouse switches 54, 56 and 58 are disposed in one central location, the mouse switches 54, 56 and 58 are easier to locate that prior control keys that may be spaced across an instrument panel. In addition, the mouse 18 may be adjusted as described above, so that the driver may rest his arm on a rear portion of the console 20 while operating the mouse switches 54, 56 and 58.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A multi-function control device for use with a motor vehicle, the device comprising:

a display unit adapted to be mounted to the vehicle, the display unit having a display screen for displaying information associated with a plurality of vehicle functions, and a plurality of keys corresponding to the plurality of vehicle functions, the display screen having at least two portions, each of the keys being operable to select a particular vehicle function so as to display information associated with the particular vehicle function on the display screen;

a mouse adapted to be mounted to the vehicle proximate the display unit, the mouse having at least two mouse switches in communication with the display unit, the at least two mouse switches being operable to control the plurality of vehicle functions , each mouse switch corresponding to a respective portion of the display screen.

2. The multi-function control device of claim 1 wherein the display unit has seven keys and the mouse has three mouse switches.

3. The multi-function control device of claim 1 wherein the display screen provides a normal display for displaying information associated with at least one of the plurality of vehicle functions, an active display for each vehicle function for displaying at least one feature of each vehicle function, and an advanced display for each vehicle function for displaying another feature of each vehicle function.

4. The multi-function control device of claim 1 wherein the mouse is adapted to be moveably mounted to the vehicle.

5. The multi-function control device of claim 1 wherein the mouse is adapted to be moveably mounted to the vehicle such that the mouse may be moved fore and aft.

6. The multi-function control device of claim 1 wherein the at least two portions of the display screen are columns.

7. The multi-function control device of claim 1 wherein the display screen includes at least two lights for identifying the at least two portions of the display screen, each light corresponding to a respective portion.

8. The multi-function control device of claim 1 wherein the display screen includes three separate portions and the mouse includes three mouse switches, each mouse switch corresponding to a respective separate portion of the display screen.

9. The multi-function control device of claim 8 wherein the display screen includes three lights for identifying the separate portions, each light corresponding to a respective-separate portion.

10. The multi-function control device of claim 1 wherein each mouse switch is moveable in two directions.

11. A multi-function control device for use with a motor vehicle, the device comprising:

a display unit adapted to be mounted to the vehicle, the display unit having a display screen for displaying features associated with a plurality of vehicle systems, and a plurality of keys corresponding to the plurality of vehicle systems, the display screen including a plurality of columns and a plurality of lights for identifying the columns, each light corresponding to a particular column, each of the keys being operable to select a particular vehicle system so as to display at least one feature associated with the particular vehicle system on the display screen in at least one column;

a mouse adapted to be mounted to the vehicle proximate the display unit, the mouse having a plurality of mouse switches in communication with the display unit, each mouse switch corresponding to a particular column and being operable to adjust a feature displayed in the particular column.

12. The multi-function control device of claim 11 wherein the plurality of columns includes three columns, the plurality of lights includes three lights, and the plurality of mouse switches includes three mouse switches.

* * * * *

UNITED STATES PATENT AND TRADEMARK OFFICE
CERTIFICATE OF CORRECTION

PATENT NO.     : 6,424,337 B1                                     Page 1 of 1
DATED          : July 23, 2002
INVENTOR(S)    : Harry S. Eriksson et al.

It is certified that error appears in the above-identified patent and that said Letters Patent is hereby corrected as shown below:

<u>Column 6,</u>
Line 38, delete "a".
Line 39, delete "nd" and insert -- and --.

Signed and Sealed this

Twenty-fifth Day of March, 2003

JAMES E. ROGAN
*Director of the United States Patent and Trademark Office*